US009519777B2

United States Patent
Brown et al.

(10) Patent No.: US 9,519,777 B2
(45) Date of Patent: Dec. 13, 2016

(54) TECHNIQUES FOR CONTROLLING AUTHENTICATION

(75) Inventors: Jeremy Ray Brown, Orem, UT (US); Jason Allen Sabin, Lehi, UT (US); Lloyd Leon Burch, Payson, UT (US); Douglas Garry Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 193 days.

(21) Appl. No.: 13/286,013

(22) Filed: Oct. 31, 2011

(65) Prior Publication Data

US 2013/0111543 A1 May 2, 2013

(51) Int. Cl.
G06F 21/60 (2013.01)
G06F 21/55 (2013.01)
H04L 29/06 (2006.01)

(52) U.S. Cl.
CPC ........... *G06F 21/552* (2013.01); *G06F 21/604* (2013.01); *H04L 63/0227* (2013.01); *H04L 63/0884* (2013.01); *H04L 63/10* (2013.01)

(58) Field of Classification Search
CPC ............. H04L 63/0227; H04L 63/0245; H04L 63/0254; H04L 63/0263
See application file for complete search history.

(56) References Cited

U.S. PATENT DOCUMENTS

| | | | |
|---|---|---|---|
| 7,191,467 B1 | 3/2007 | Dujari et al. | |
| 7,698,735 B2 | 4/2010 | Dujari | |
| 7,895,432 B2 | 2/2011 | Bjorn | |
| 7,900,247 B2 | 3/2011 | Chong | |
| 2004/0088542 A1* | 5/2004 | Daude et al. | 713/156 |
| 2006/0015358 A1 | 1/2006 | Chua | |
| 2007/0016527 A1 | 1/2007 | Lyons | |
| 2007/0234408 A1* | 10/2007 | Burch et al. | 726/6 |
| 2008/0209040 A1* | 8/2008 | Rathi | 709/226 |
| 2009/0217351 A1* | 8/2009 | Burch et al. | 726/3 |
| 2009/0249439 A1* | 10/2009 | Olden et al. | 726/1 |
| 2009/0307360 A1* | 12/2009 | Ianchici et al. | 709/229 |
| 2011/0041171 A1* | 2/2011 | Burch | H04L 63/08 726/7 |
| 2011/0214165 A1* | 9/2011 | Jeffreys | G06F 17/30545 726/5 |
| 2011/0265155 A1* | 10/2011 | Liu | H04L 63/0815 726/5 |
| 2012/0151568 A1* | 6/2012 | Pieczul et al. | 726/8 |

\* cited by examiner

*Primary Examiner* — David Pearson
(74) *Attorney, Agent, or Firm* — Schwegman Lundberg & Woessner, P.A.

(57) ABSTRACT

Techniques for controlling authentication are provided. An enterprise injects a control and/or audit manager into the enterprise environment to control and in some instances audit third-party authentication services. A user attempts to access a resource that uses a third-party authentication service. The attempt is intercepted and third-party authentication handled by the manager. After authentication, a session between the user and the resource is established during which auditing services may be enacted. The user authenticates to the enterprise environment and the manager provides authentication for the user to the resource via the third-party authentication service.

10 Claims, 5 Drawing Sheets

TECHNIQUES FOR CONTROLLING AUTHENTICATION

BACKGROUND

Increasingly, the physical location and management of physical and logical (software) assets for an enterprise are being outsourced to what is referred to in the industry as cloud environments. The ability to outsource the management and support of both physical and logical assets has a tremendous upside to enterprises.

One technology area that consumes a lot of Information Technology (IT) resources is authentication. A typical IT department has to deploy a variety of protocols, storage, and services to support authentication for access to enterprise resources. The industry has recognized this issue and has responded with OpenID.

OpenID is a non-profit consortium of developers, entrepreneurs, designers, and enterprises dedicated to improving identity-based technologies, security-based technologies, and privacy-based technologies.

OpenID permits an enterprise to outsource authentication for access to the enterprise's resources. This is done by permitting users to use one OpenID identifier and password to access multiple different enterprise sites. The enterprise benefits in that authentication is outsourced to a cloud, such that management and support is no longer an internal issue to the enterprise. The user benefits in that authentication to multiple sites require only a single identifier and password, such that multiple identifiers and passwords need not be remembered.

Essentially, OpenID is an authentication protocol being used in cloud environments to provide authentication for low to medium value web services. The protocol has proved to be very popular because it provides basic security with a very simple setup implementation.

One of the perceived weaknesses of OpenID is that almost any service provider can request authentication from almost any identity provider. However, in most enterprise environments access control of sites that can be authenticated is needed as well as auditing of access to such sites; this is needed for providing required compliance and security. Moreover, for internal enterprise users to gain access to other services via the OpenID protocol requires them to remember an additional OpenID identity for that which is used to authentication within the enterprise.

SUMMARY

Various embodiments of the invention provide techniques for controlling authentication. Specifically, a method for authentication control is presented.

DETAILED DESCRIPTION

Figure 1:
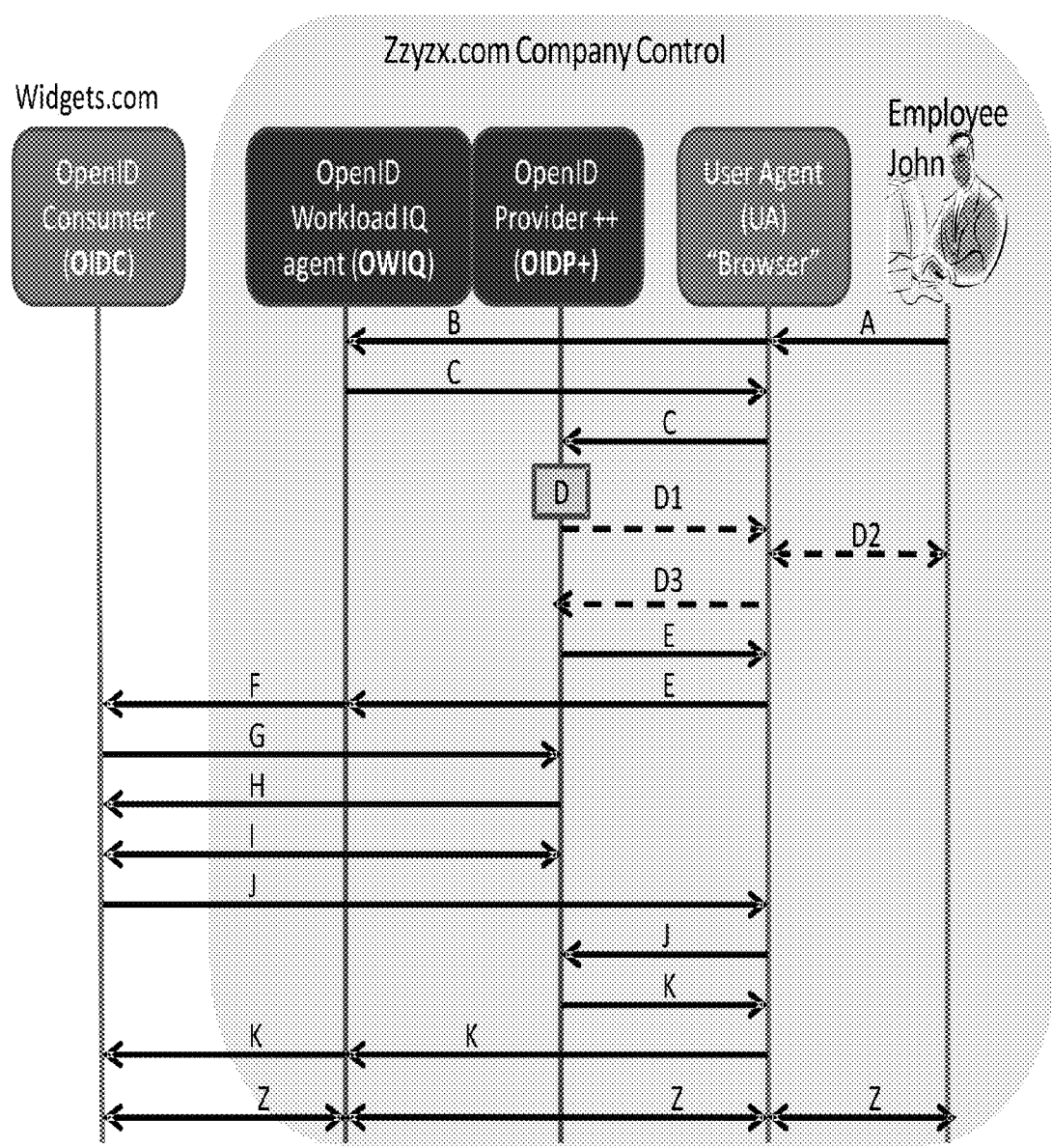
FIG. 1 is a diagram of an example entity interaction diagram for controlling and auditing authentication, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, proxy products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram of an example entity interaction diagram for controlling and auditing authentication, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a specific example situation that an enterprise and an enterprise user may encounter. This is presented for purposes of illustration only as other situations can occur as well and still benefit from the techniques presented herein and below.

As will be demonstrated herein and below, embodiments provided herein eliminate the need for enterprise users to remember an OpenID identity. The techniques also eliminate the need for the OpenID protocol to ask users to validate whether a site should be allowed access; use of the OpenID identity as an implied trust is established to take care of this. The selection of which identity provider to use is also left to the end user. As is already well understood, the risk of fraud and user confusion can be very problematic for the enterprise.

The techniques herein: 1) Provide access control, allowing only specified sites to be authenticated, this provides an implied trust, eliminating the need for the user to allow access to the site via a prompt; 2) provide auditing (at various levels) about access activity for a service; 3) provide access to specified sites without the need for users to remember the OpenID identifier established by the enterprise; this reduces help desk support costs and reduces risk of fraud and user confusion; and 4) reduces the inputs an end user must make in order to access services using the OpenID protocol; that is, the user will not be asked to input an OpenID identity nor will the user be asked to confirm that the service should be authenticated.

It is noted that the techniques described herein do not change the OpenID protocol; rather, the techniques just introduce an agent into the protocol flow of the OpenID process. These techniques can be used with any third-party authentication that is outsourced by an enterprise, such that the techniques are not exclusively tied to the OpenID implementation. Yet, OpenID is currently very popular and as such is understood in the industry and as such the examples that follow with scenarios of two embodiments of the invention are discussed in the context of OpenID.

The primary embodiments of the invention are provided. In the first embodiment, all authentication service access is captured and run through a WorkLoad IQ Agent (may be referred to herein as "agent; the benefits of this are increased auditing capability with increased setup complexity. In the second embodiment (shown and discussed with reference to the FIG. 2) authentication access only is captured via the WorkLoad IQ Agent requiring significantly less setup complexity.

The techniques described herein assume that corporations pre identify a list of services to provide access to (sites for which a third-party authentication is being used). The WorkLoad IQ Agent is configured to allow access to such sites using OpenID (or as discussed above, other third-party single sign-on authentication services). Access to such services is done through the agent. It is assumed that end users are provided access to their identity via credentials such as name and password. In the embodiment, a user's identity is enhanced by the automated creation of an OpenID identity (that is typically unknown to the user) that allows the enterprise OpenID Provider to authenticate services.

When a user wants to access a service, a Uniform Resource Locator (URL) link at the WorkLoad IQ Agent (agent) identifies the activation of the link processed by the user. The agent redirects to the OpenID provider where credentials are entered. The agent then redirects to the desired service injecting the OpenID identity for the user into the request. The service then uses the OpenID protocol to interact with the enterprise OpenID provider to authenticate the user. Since access to the service was initiated at the enterprise, this implies that access should be granted and no further prompting for permission is necessary. At various points along the request/response chain, auditing events are generated providing an access to the history of events. Using these techniques, at no time does the user need to remember the OpenID identity as it is always injected automatically by the techniques (for both embodiments discussed in FIGS. 1 and 2).

For purposes of illustration, a typical OpenID process flow is now discussed before referencing the FIGS. 1 and 2 that discussed techniques presented herein. Assume for the example that Zzyzx.com is a company that needs to use cloud services but, does not want to setup a more complex Security Assertion Markup Language (SAML) protocol or other federation protocol. John (sample user) is an employee of the ZZYZX.com enterprise and needs to use Widgets.com to do his job. Widgets.com is a company that has an OpenID consumer enabled service.

Things to note for the example are that John can go to any service he chooses and use any OpenID Provider. He must use the passwords and ID he set on the OpenID Provider (OIDP) and any authentication done at Zzyzx.com cannot be used. There is not a practical way for Zzyzx.com to audit the use of the Widgets.com service. Additionally, the Zzyzx.com does not have any control over the identity of the user.

A typical OpenID process flow proceeds as follows (this is not shown in the FIG. 1). John inputs the URL address of the service he wants to access; for example "widgets.com/serviceA." The Browser (User Agent process referred to as "UA") request the URL from the OpenID Consumer (OIDC). The OIDC requests the OpenID identifier. The UA prompts the user for his OpenID name identifier and John inputs a valid OpenID name identifier (e.g., John.Oidp.com). John must know his name identifier and the corporate system has no control of what the John inputs. The UA send the OpenID name to the OIDC. The OIDC now requests the location of the OpenID provider for OIDP. The OIDP returns a link to the OIDP provider. The OIDC and the OIDP now negotiate using the OpenID protocol. The OIDC now responds to the request, by redirecting the user to the OIDP. The OIDP sends a form requesting a password. The UA prompts John for his OIDP.COM password. John inputs his password and presses the submit button. At this point, the user (John in the example scenario) may also be asked to validate that the service provider should be authenticated. The form is posted to the OIDP and validated. The OIDP redirects the UA to the OIDC, including the original URL, OIDP validation of credentials in an authentication proof of trust statement and which may have other user attributes. The user, via the UA, now continues using the OIDC services. It is noted that in this typical OpenID process there is no way for the enterprise to audit or control what services are being used by the employee user.

The first embodiment where control and auditing are interjected into the OpenID process flow is now discussed to solve the typical limitations of the OpenID process.

Reference is now made to the FIG. 1 and the embodiment or scenario number 1 is discussed. Scenario 1 includes the OpenID WorkloadIQ agent (referred to as "OWIQ" in the FIG. 1) and an OpenID Provider (OIDP).

Again Zzyzx.com is a company that needs to use single sign on to cloud services by using John's local credentials to authenticate him but, these local credentials cannot leave the corporate control. Zzyzx.com needs to control and audit all use of Widgets.com.

Widgets.com is a company that has an OpenID consumer (OIDC) enabled service. John has been provisioned to Widgets.com by some mechanism and as part of the provisioning process the ID used by John at Widgets.com is known to the invention OIDP+ component (enhanced service provided by the techniques herein).

The entity process flow for embodiment 1 proceeds as follows.

At A, John selects the web service he wishes to use. This is most likely be done by clicking on a hypertext link (URL link) on the enterprise web page or portal. The link does not point directly to the widgets.com page but, points to the enterprise OpenID WorkloadIQ Agent (OWIQ) that is an alias to the widgets.com site. An example URL might be appear as follows: http://zzyzx.com/OutSideServices/widgets/serviceA.

At B, the browser requests the URL from the (OWIQ).

At C, if the OWIQ has a valid session with John's browser, the processing sequence goes to E. If the OWIQ does not have a valid session with John's browser, the OWIQ redirects the browser to the OpenID Provider+ (OIDP+).

At D, if the OIDP+ has a valid session with John's browser, the processing sequence goes to E. If the OIDP+ does not have a valid session with John's browser the processing sequence goes to D1.

At D1, the OIDP issues a request to negotiate client-based authentication, such as NTLM (NT Local Area Network (LAN) Manager) or Kerberos. If John used a domain-based authentication to authenticate his desktop this returns an "Auth Token" via D3. If it does, the token is validated and the processing sequence goes to E.

At D2, if there is no session on the browser or the client machine, then the user is prompted to enter his credentials into the browser and the credentials are sent to the OIDP, via D3, where the credentials are validated. It is noted that this particular user interaction does not happen very often if the system is setup for Single Sign On (SSO) within the enterprise. Most of the time, John will not have any interaction to get SSO to cloud Software as a Service (SaaS) services that have been enabled by the administrator.

At E, the OIDP redirects the UA to the OIDC, via OWIQ, and includes with the redirection the original requested URL and OIDP validation of credentials for the OWIQ in an authentication proof of trust statement. This statement has other user attributes included with it, such as the OpenID identifier. This statement is now used to authenticate the OWIQ.

At F, the OWIQ now allows the flow to the OIDC. The OWIQ now posts the OpenID identifier to the OIDC.

At G, the OIDC now requests the location of the OpenID provider for OIDP.

At H, the OIDP returns a link to the OIDP provider (which is its own location).

At I, the OIDC and the OIDP now negotiate using the OpenID protocol.

At J, the OIDC now responds to the request in E by redirecting the user to the OIDP. The OIDP already knows who the user is so no passwords or other proof are required. Additionally, no user interaction is required to grant permission.

At K, the OIDP now redirects the UA to the OIDC and is granted authenticated access.

At Z, the user, via the UA, now continues using the OIDC services. It is noted that the processing flow is now though the OWIQ. This allows complete audit and control of the services used by John; the same as if the SaaS workload were hosted in the enterprise firewall.

Figure 2:
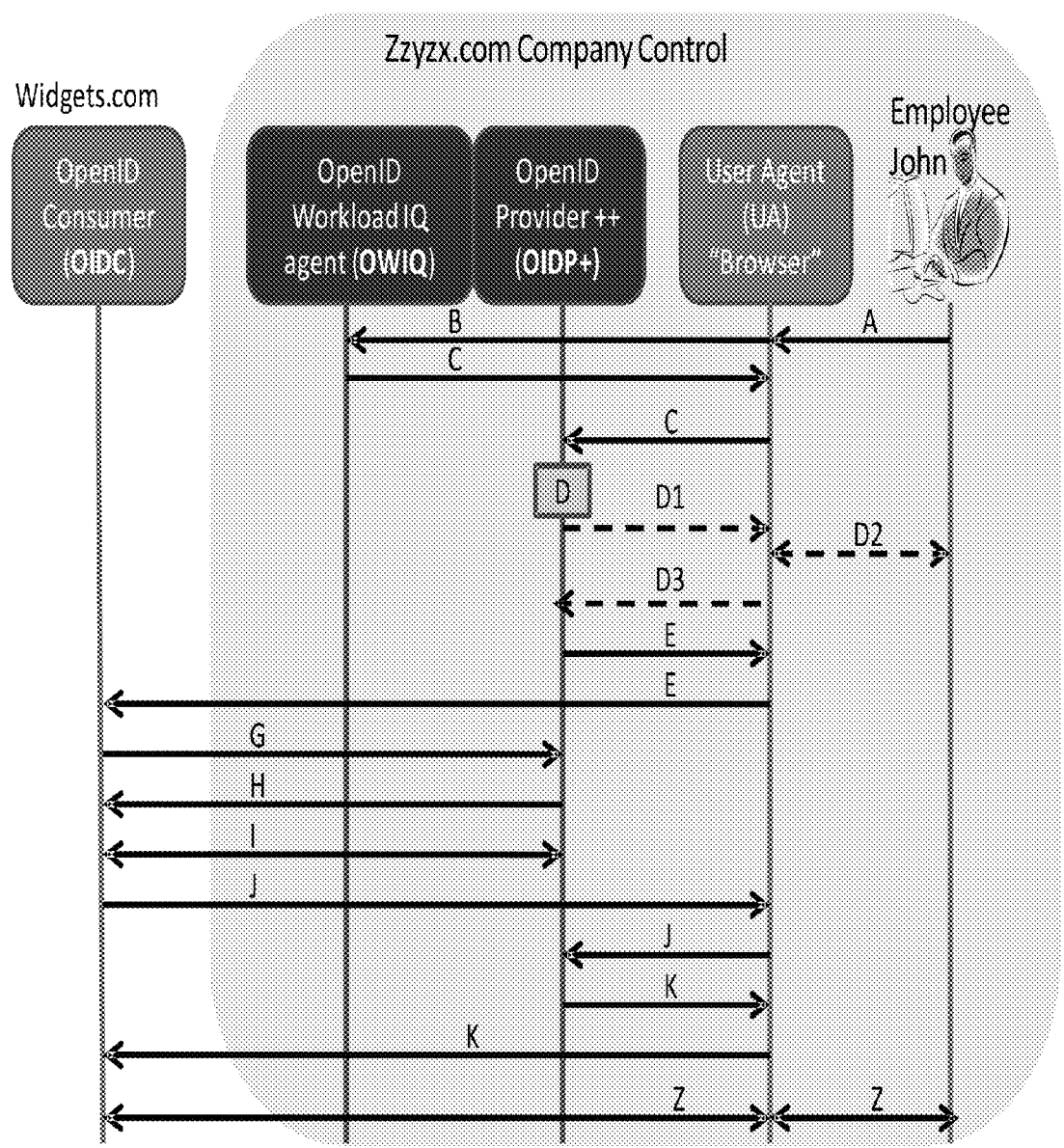
FIG. 2 is a diagram of an example entity interaction diagram for controlling authentication, according to the techniques presented herein.

FIG. 2 is a diagram of an example entity interaction diagram for controlling authentication, according to the techniques presented herein. Again, the components of the FIG. 2 are implemented in non-transitory and processor-readable storage medium and are executed on physical processors on one or more networks. Each processor specifically configured to execute the components.

The FIG. 2 is presented with reference to the specific example situation (presented initially above with reference to the FIG. 1) that an enterprise and an enterprise user may encounter. This is presented for purposes of illustration only as other situations can occur as well and still benefit from the techniques presented herein and below.

The second embodiment or second scenario includes the OpenID WorkloadIQ agent (OWIQ) and OpenID Provider (OIDP). Here, control over authentication is managed but auditing is not used as it was in the FIG. 1 embodiment.

Once again, Zzyzx.com is a company that needs to use Single Sign On (SSO) to Cloud services by using John's local credentials to authenticate him but, these local credentials do not leave the enterprise's control. Zzyzx.com needs to control the authentication only to Widgets.com.

Widgets.com is an enterprise that has an OpenID consumer (OIDC) enabled service. John has been provisioned to Widgets.com by some mechanism and as part of the provisioning process the ID used by John at Widgets.com is known the techniques presented.

Now authentication control for the second embodiment is presented with reference to the FIG. 2.

At A, John selects the web service he wishes to use. This is most likely done by clicking on a hypertext URL link on the company web page or portal. The link does not point directly to the widgets.com page but, points to the company OpenID WorkloadIQ Agent (OWIQ) that is an alias to the widgets.com site. For example, URL might be appear as follows: http://zzyzx.com/OutSideServices/widgets/serviceA.

At B, the browser requests the URL from the (OWIQ).

At C, if the OWIQ has a valid session with John's browser, the processing sequence goes to E. If the OWIQ does not have a valid session with John's browser, the OWIQ redirects the browser to the OpenID Provider+ (OIDP+).

It is noted that the processing of D, D1, D2, and D3 are used to authenticate the OIDP by using local enterprise credentials for John and not using the OIDP credentials, which John is completely unaware of.

At D, if the OIDP+ has a valid session with John's browser, the processing sequence goes to E. If the OIDP+ does not have a valid session with John's browser the processing sequence goes to D1.

At D1, the OIDP issues a request to negotiate client based authentication, such as NTLM or Kerberos. If John used a domain-based authentication to authenticate his desktop this returns an "Auth Token" via D3. If it does, the token is validated and the processing sequence flow goes to E.

At D2, if there is no session on the browser or the client machine, the user is prompted to enter his credentials into the browser and the credentials are sent to the OIDP, via D3, where the credentials are validated. It is noted that this user interaction does not happen very often if the system is setup for SSO within the enterprise. In fact, most of the time John does not have any interaction to get SSO to cloud SaaS services that have been enabled by the administrator.

At E, the OIDP redirects the UA to the OIDC with an auto submitting form that posts the OpenID identifier that belongs to John to the OIDC.

At G, the OIDC now requests the location of the OpenID provider for OIDP.

At H, the OIDP returns a link to the OIDP provider (which is its own location).

At I, the OIDC and the OIDP now negotiate using the OpenID protocol.

At J, the OIDC now responds to the request in E, by redirecting the user to the OIDP. The OIDP already knows who the user is so no passwords or other proof is required. Additionally, no user interaction is required to grant permission.

At K, the OIDP now redirects the UA (browser) to the OIDC with the OpenID parameters and is granted authenticated access.

At Z, the user via the UA now continues using the OIDC services. It is noted that the processing flow is not though the OWIQ. This technique for the second embodiment does not allow auditing of anything more than the authentication of the service but, does reduce the traffic and complexity of enterprise management and control of third-party SSO services.

The techniques herein solve several problems with easy to use web applications. It does this by using the Open ID protocol to authenticate to SaaS services in the cloud, while removing most if not all user interaction and control. Conventionally, if the Open ID protocol were used, the user selects an OpenID vendor and must remember new passwords and names to use. Herein, the techniques allow a local authentication to be used to an external SSO SaaS service without sharing the internal credentials with the SSO SaaS vendor or an external Open ID Provider. This is done without user interaction or knowledge, because the end user does not know or need to know the ID or passwords, the system can control access to the OpenID service.

The first embodiment also proxies interaction between the user and the SSO SaaS vendor and thereby allows the use of the SSO SaaS service to be audited. The technique automates the use of Open ID and can control the Identity Providers (IDPs) that can be used by limiting the selection list of services. Furthermore, the technique allows an Open ID IDP to be used by employees or those the company grants access to. The techniques add control and access policies to the Open ID protocol, without altering or changing the existing Open ID protocol. The techniques also allow enterprises to enable compliance by guaranteeing the use a SOS SaaS service.

Figure 3:
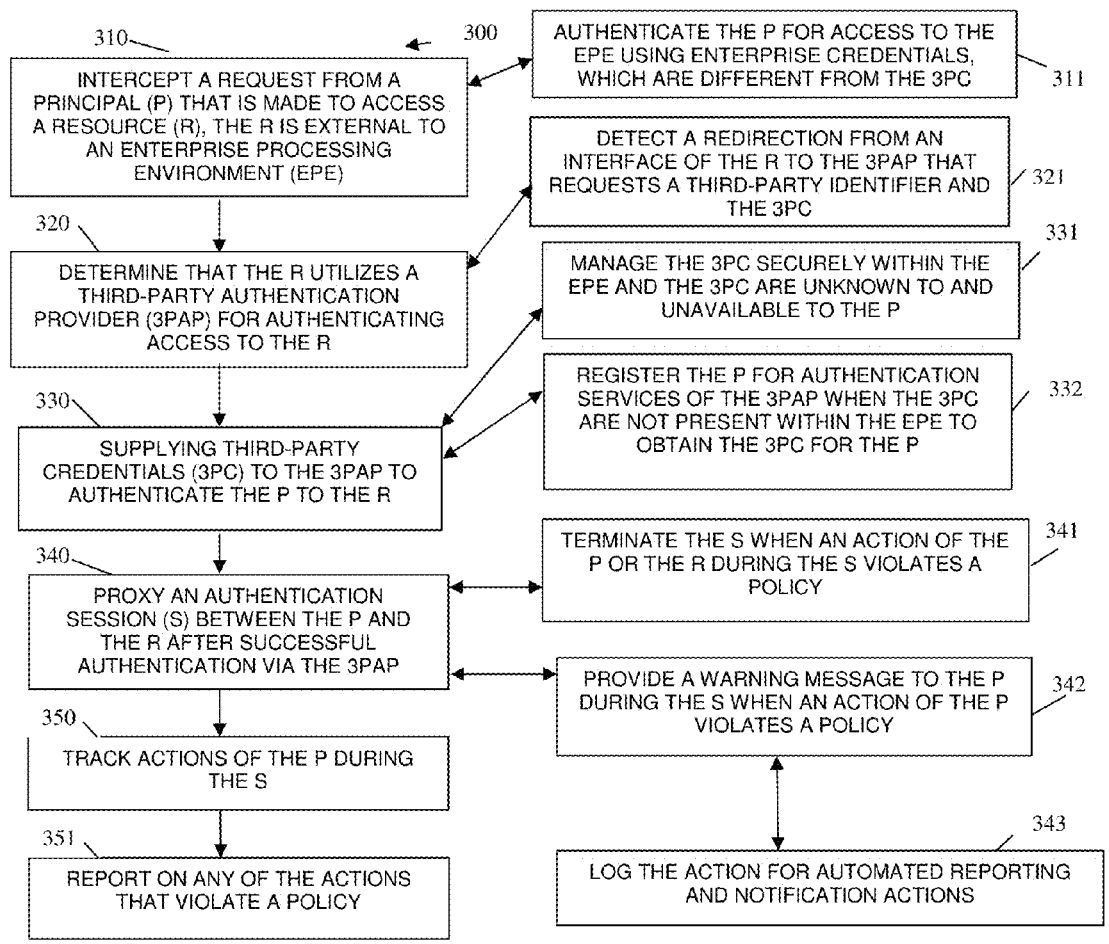
FIG. 3 is a diagram of a method for controlling and auditing authentication, according to an example embodiment.
Figure 4:
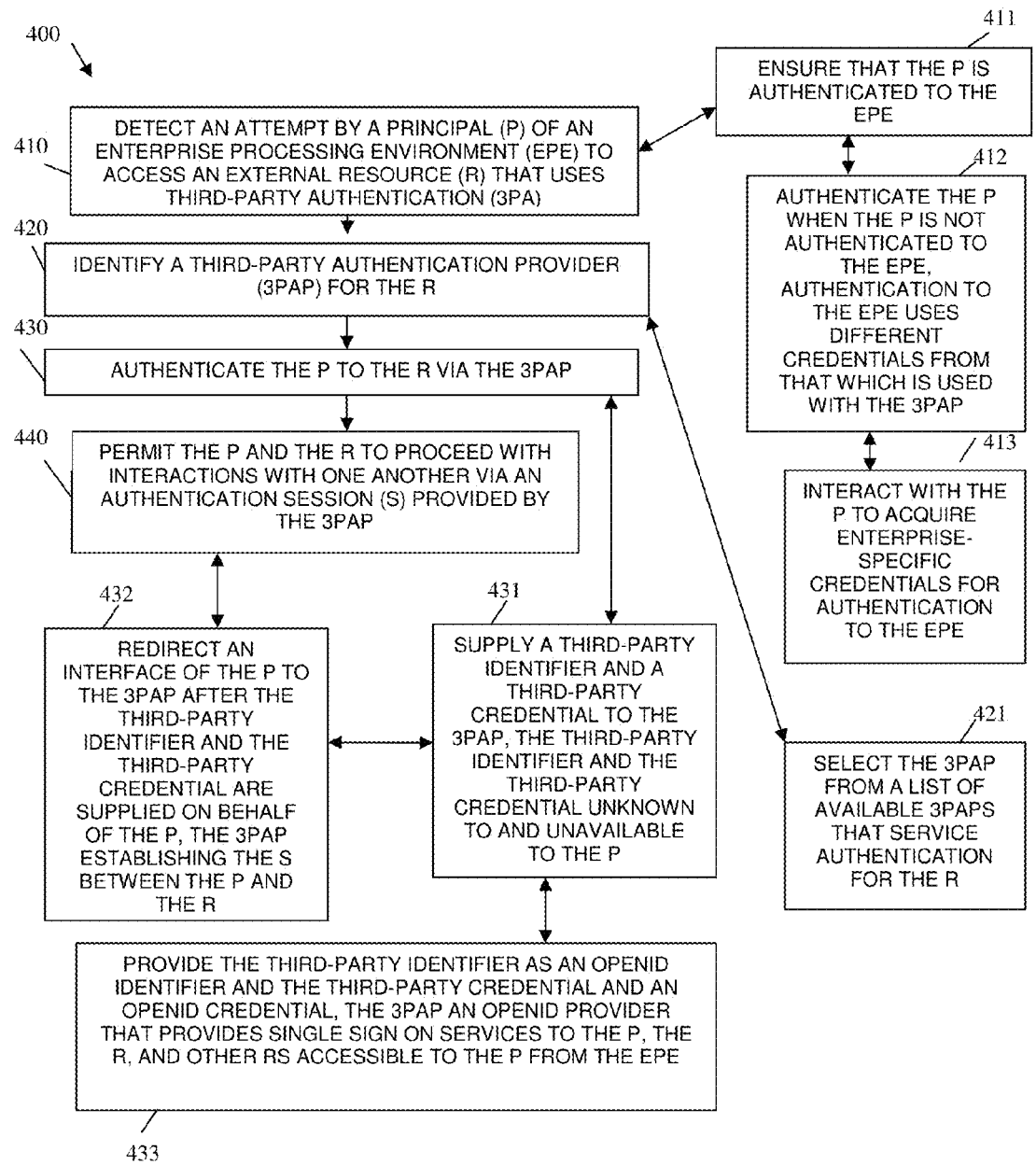
FIG. 4 is a diagram of a method for controlling authentication, according to an example embodiment.
Figure 5:
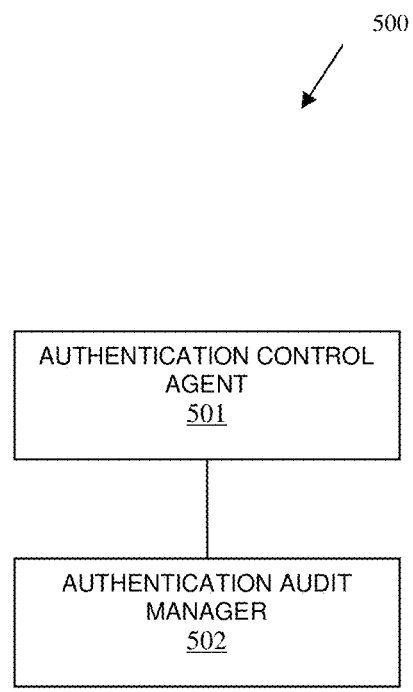
FIG. 5 is a diagram of an authentication management system, according to the techniques presented herein.

The remaining FIGS. 3-5 now provide specific embodiments of the overall techniques discussed above with reference to the FIGS. 1 and 2.

FIG. 3 is a diagram of a method 300 for controlling and auditing authentication, according to an example embodiment. The method 300 (hereinafter "authentication audit manager") is implemented and resides within a non-transitory computer-readable or processor-readable medium that executes on one or more processors of a network. Moreover, the authentication audit manager is operational over a network and the network may be wired, wireless, or a combination of wired and wireless.

The authentication audit manager is presented from the perspective of the first embodiment, discussed in detail above with reference to the FIG. 1.

At 310, the authentication audit manager intercepts a request from a principal (user or automated resource, such as a program or application). The request is made to access a resource that is external to an enterprise processing environment. The principal and the authentication audit manager operate from within the enterprise processing environment and the resource is externally accessible over a network connection, such as but not limited to the Internet. In an embodiment, the resource is accessible via a website, such as was discussed with the example presented in the discussion of the FIGS. 1 and 2. The authentication audit manager acts as a transparent proxy to a client device of the principal; so, the client device is not preconfigured to access the transparent proxy. External communication ports can be monitored by the authentication audit manager to detect the request made from the principal via the client device.

According to an embodiment, at 311, the authentication audit manager authenticates the principal for access to the enterprise processing environment using enterprise credentials, which are different from third-party credentials (discussed below at 330).

At 320, the authentication audit manager determines that the resource utilizes a third-party authentication provider for authenticating access to the resource. That is, the resource permits authentication to it to be outsourced to the third-party authentication provider.

In an embodiment, at 321, the authentication audit manager detects a redirection from an interface of the resource to the third-party authentication provider. The interface from the third-party authentication provider requests a third-party identifier and third-party credentials.

At 330, the authentication audit manager supplies third-party credentials to the third-party authentication provider for purposes of authenticating the principal for access to the resource. The principal is unaware of this authentication and the actions of the authentication audit manager.

According to an embodiment, at 331, the authentication audit manager manages the third-party credentials securely within the enterprise processing environment. Moreover, the third-party credentials are unknown to and unavailable to the principal.

In another case, at 332, the authentication audit manager registers the principal for authentication services of the third-party authentication provider when the third-party credentials are not present within the enterprise processing environment for the principal. So, an Application Programming Interface (API and can be via automated inspection of and input to web pages) for the third-party authentication provider is used to initially acquire the third-party credentials for the principal when the principal was not previously registered with the third-party authentication provider.

At 340, the authentication audit manager proxies an authentication session between the principal and the resource after successful authentication via the third-party authentication provider. The proxy services are done from the enterprise processing environment. This permits a number of beneficial operations or features for the enterprise associated with the enterprise processing environment.

According to an embodiment, at 341, the authentication audit manager terminates the authenticated session when an action of the principal or the resource during the authenticated session violates a predefined policy condition(s).

In another situation, at 342, the authentication audit manager provides a warning message to the principal during the authenticated session when an action of the principal violates a predefined policy condition(s).

Continuing with the embodiment of 342 and at 343, the authentication audit manager logs the violating action for subsequent automated reporting and notification actions of the authentication audit manager.

In an embodiment, at 350, the authentication audit manager tracks actions of the principal during the authenticated session.

Continuing with the embodiment of 350 and at 351, the authentication audit manager reports any of the actions that violate policy.

FIG. 4 is a diagram of a method 400 for controlling authentication, according to an example embodiment. The method 400 (hereinafter "authentication control agent") is implemented and resides within a non-transitory computer-readable or processor-readable medium that executes on one or more processors of a network. Moreover, the authentication control agent is operational over a network and the network may be wired, wireless, or a combination of wired and wireless.

The authentication control agent provides processing from the perspective of the second embodiment, discussed above with reference to the FIG. 2.

At 410, the authentication control agent detects an attempt by a principal (user or automated resource (program, service, etc.)) of an enterprise processing environment to access an external resource that uses a third-party authentication provider.

The authentication control agent provides similar features with respect to controlling authentication that is outsourced from the enterprise environment to a third-party authentication provider but does not proxy the subsequent authenticated session, as discussed more completely below.

According to an embodiment, at 411, the authentication control agent ensures that the principal is authenticated to the enterprise processing environment. That is, a determination is made as to whether the principal has an enterprise authenticated session with the enterprise processing environment.

Continuing with the embodiment of 411 and at 412, the authentication control agent authenticates the principal when the principal is not already authenticated to the enterprise processing environment. The authentication to the enterprise processing environment uses different credentials from that which is used with the third-party authentication provider.

Still continuing with the embodiment of 412 and at 413, the authentication control agent interacts with the principal to acquire enterprise specific credentials for authentication to the enterprise processing environment.

At 420, the authentication control agent identifies a third-party authentication provider for the external resource.

For example, at 421, the authentication control agent selects the third-party authentication provider from a list of available third-party authentication providers for the external resource.

At 430, the authentication control agent authenticates the principal to the external resource via the third-party authentication provider.

In an embodiment, at 431, the authentication control agent supplies a third-party identifier and a third-party credential to the third-party authentication provider. Here, the third-party identifier and the third-party credential are unknown and unavailable to the principal.

Continuing with the embodiment of 431 and at 432, the authentication control agent redirects an interface of the principal to the third-party authentication provider after the third-party identifier and the third-party credential are supplied on behalf of the principal. Here, the third-party authentication provider establishes the authenticated session between the principal and the external resource.

Still continuing with the embodiment of 431 and at 433, the authentication control agent provides the third-party identifier as an Open ID identifier and the third-party credential as an OpenID credential. The third-party authentication provider provides single sign on (SSO) services to the principal, the external resource, and other external resources accessible to the principal from the enterprise processing environment.

At 440, the authentication control agent permits the principal and the external resource to proceed with interactions with one another via an authenticated session, which is provided and established by the third-party authentication provider. So, unlike the authentication audit manager of the FIG. 3, the authentication control agent does not proxy or host the authentication session and no audit features are enabled.

FIG. 5 is a diagram of an authentication management system 500, according to the techniques presented herein. The components of the authentication management system 500 are implemented within and reside within a non-transitory and computer or processor-readable storage medium for purposes of executing on one or more processors of a network. The network may be wired, wireless, or a combination of wired and wireless.

The authentication management system 500 implements, inter alia, various aspects of the FIGS. 1-2, and the methods 300 and 400 of the FIGS. 3 and 4, respectively.

The authentication management system 500 includes an authentication audit manager 401 and an authentication control agent 402. Each of these and their interactions with one another will be discussed in turn.

The authentication management system 500 includes one or more processors configured with the authentication audit manager 401, which is implemented in a non-transitory computer-readable storage medium as executable instructions that process on the processor(s).

In an embodiment, the processors are a server or cloud-based set of servers for a particular source cloud environment.

Example processing associated with the authentication audit manager 401 was presented above with reference to the FIGS. 1 and 3.

The authentication management system 500 also includes another and different set of processors (may in some embodiments be the same set of processors as well) configured with the authentication control agent 402. The authentication control agent 402 is implemented in a non-transitory computer-readable storage medium as executable instructions that process on the processor(s).

Example processing associated with the authentication control agent 402 was presented in detail above with respect to the FIGS. 2 and 4.

The authentication control agent 402 is configured to intercept an access request to an external resource made by a principal. The authentication control agent 402 is also configured to identify a third-party authentication provider for the external resource and provide credentials on behalf of the principal for purposes of the principal being authenticated to the external resource for an authenticated session with the external resource. The credentials are not known and not available to the principal.

The authentication audit manager 401 is configured to proxy the authenticated session from the enterprise processing environment. The authentication audit manager 401 is also configured to monitor actions of the principal during the authenticated session.

According to an embodiment, the third-party authentication provider is an Open ID provider that provides SSO services to the principal via the credentials to the external resource and other external resources accessible to the principal via the enterprise processing environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors of a processing device and configured to perform the method, comprising:
   intercepting, by the processing device acting as a transparent proxy to a principal, a request from the principal that is made to access a resource, the resource is external to an enterprise processing environment and a device used by the principal within the enterprise processing environment is not preconfigured to interact with the transparent proxy, and wherein intercepting further includes authenticating the principal for access to the enterprise processing environment using enterprise credentials and ensuring that the principal has a valid session with an agent of the enterprise processing environment that includes an authentication token representing domain-based authentication of a desktop for the principal, the enterprise credentials are different from third-party credentials processed for authenticating the principal for access to the resource;
   determining, by the processing device, that the resource utilizes a third-party authentication provider for authenticating access to the resource;
   supplying, by the processing device, the third-party credentials to the third-party authentication provider to authenticate the principal to the resource, wherein supplying further includes managing the third-party credentials securely within the enterprise processing environment and the third-party credentials are unknown to, unavailable to, never supplied by, and never available to the principal and the enterprise credentials for the principal never leave the enterprise environment; and
   proxying, by the processing device and from within the enterprise processing environment, an authentication session between the principal and the resource after successful authentication via the third-party authentication provider, the authentication session proxied by the enterprise environment for interactions between the principal and the resource during that authentication session.

2. The method of claim 1 further comprising, tracking, by the processing device, actions of the principal during the authenticated session.

3. The method of claim 2 further comprising, reporting, by the processing device, on any of the actions that violate a policy.

4. The method of claim 1, wherein determining further includes detecting a redirection from an interface of the resource to the third-party authentication provider that requests a third-party identifier and the third-party credentials.

5. The method of claim 1, wherein supplying further includes registering the principal for authentication services of the third-party authentication provider when the third-party credentials are not present within the enterprise processing environment to obtain the third-party credentials for the principal.

6. The method of claim 1, wherein proxying further includes terminating the authenticated session when an action of the principal or the resource during the authenticated session violates a policy.

7. The method of claim 1, wherein proxying further includes providing a warning message to the principal during the authenticated session when an action of the principal violates a policy.

8. The method of claim 7, wherein providing further includes logging the action for automated reporting and notification actions.

9. A system, comprising:
   a processing device configured with an authentication control agent that resides and is implemented as executable instructions within a non-transitory computer-readable storage medium that executes on the processing device as a transparent proxy within an enterprise processing environment; and
   another processing device or the processing device configured with an authentication audit manager that resides and is implemented within a non-transitory computer-readable storage medium that executes on one of the processing devices;
   the authentication control agent configured to intercept an access request to an external resource made by a principal and configured to identify a third-party authentication provider for the external resource and provide credentials on behalf of the principal for the principal to be authenticated to the external resource for an authenticated session, the principal unaware of the credentials, and the authentication audit manager is configured to proxy the authenticated session from within the enterprise processing environment and monitor actions of the principal during the authenticated session, wherein the authenticated session is proxied by the enterprise processing environment for interactions between the principal and the external resource during the authenticated session, where a device accessed by the principal is not preconfigured to access the transparent proxy, and wherein the principal is to authenticated to the enterprise processing environment using local credentials that do not leave control of the enterprise environment, and wherein the credentials are different from the local credentials and the credentials are unknown to the principal, the principal is unaware of the credentials, the principal never supplied the credentials, and the principal never have the credentials made available to principal, and wherein the authentication control agent is further configured, when the principal is authenticated to the enterprise processing environment, to: ensure that the principal has a valid session with an agent of the enterprise processing environment that includes an authentication token representing domain-based authentication of a desktop for the principal.

10. The system of claim 9, wherein the third-party authentication provider is an industry consortium provider that provides single sign on services to principal via the credentials to the external resource and other external resources.

* * * * *